United States Patent [19]

Shinoki et al.

[11] Patent Number: 5,393,872
[45] Date of Patent: Feb. 28, 1995

[54] SHEETLIKE WHOLLY AROMATIC POLYAMIDE SHAPED ARTICLE AND A METHOD FOR PRODUCING THE SAME

[75] Inventors: Takanori Shinoki, Hyogo; Akio Nakaishi; Michio Yamamoto, both of Yamaguchi, all of Japan

[73] Assignee: Teijin Limited, Osaka, Japan

[21] Appl. No.: 170,801

[22] Filed: Dec. 21, 1993

[30] Foreign Application Priority Data

Dec. 22, 1992 [JP] Japan ................................. 4-342405
Mar. 2, 1993 [JP] Japan ................................. 5-041071

[51] Int. Cl.⁶ ..................... C08G 73/10; B32B 27/28; B32B 27/34
[52] U.S. Cl. .................... 528/310; 528/331; 528/332; 528/335; 428/265; 428/266; 428/267; 428/391; 428/395; 428/411.1; 428/474.4; 264/331.16; 264/331.19; 162/157.3; 162/164.4
[58] Field of Search ............... 528/310, 331, 335, 332; 428/411.1, 395, 474.4, 391, 265, 266, 267; 264/331.16, 331.19; 162/157.3, 164.4

[56] References Cited

U.S. PATENT DOCUMENTS

| 3,080,272 | 3/1963 | Jackson | 162/157 |
| 3,500,094 | 3/1970 | Gilbert | 310/233 |
| 3,523,061 | 8/1970 | Purvis | 162/157 |
| 4,060,451 | 11/1977 | Uchiyama et al. | 162/157 R |
| 4,542,065 | 9/1985 | Gaa | 428/391 |
| 4,686,135 | 8/1987 | Obayashi et al. | 427/34 |
| 4,705,527 | 11/1987 | Hussamy | 8/558 |
| 4,714,650 | 12/1987 | Obayashi et al. | 428/265 |
| 4,810,576 | 3/1989 | Gaa et al. | 428/391 |
| 4,942,094 | 7/1990 | Okamura et al. | 428/447 |
| 5,002,637 | 3/1991 | Toyoshima et al. | 162/137 |
| 5,240,770 | 8/1993 | Moriga et al. | 428/395 |

FOREIGN PATENT DOCUMENTS

| 4320421 | 9/1943 | Japan . |
| 57149703 | 10/1965 | Japan . |
| 52-35763 | 9/1977 | Japan . |
| 53-7961 | 3/1978 | Japan . |
| 57-167374 | 10/1982 | Japan . |
| 1129097 | 10/1965 | United Kingdom . |

Primary Examiner—John Kight, III
Assistant Examiner—P. Hampton-Hightower
Attorney, Agent, or Firm—Sughrue, Mion, Zinn, Macpeak & Seas

[57] ABSTRACT

This invention relates to a sheetlike wholly aromatic polyamide shaped article useful as electrical insulating materials excellent in corona resistance (corona durability) and in surface smoothness. The corona durability of said sheetlike shaped article is increased to 150 minutes or above by adding a nonionic polymer flocculant to an aqueous dispersion comprising 10 to 90% by weight of mica particles, preferably treated with a silane coupling agent and 90 to 10% by weight of a wholly aromatic polyamide stock (fibrids and fibers) in obtaining the sheetlike shaped article from the aqueous dispersion by wet shaping.

11 Claims, No Drawings

SHEETLIKE WHOLLY AROMATIC POLYAMIDE SHAPED ARTICLE AND A METHOD FOR PRODUCING THE SAME

FIELD OF THE INVENTION

This invention relates to a sheetlike wholly aromatic polyamide shaped article and a method for producing the same. More particularly, it relates to a sheetlike wholly aromatic polyamide shaped article suitable for use as electrical insulating materials, and having good heat resistance, mechanical characteristics, dimensional stability, flame retardancy, molding processability and excellent electrical insulating properties, especially corona resistance and surface smoothness, and a method for producing the same economically.

BACKGROUND OF THE INVENTION

As a result of recent demand for a higher capacity and miniaturization of electrical equipment, especially hermetic exothermic equipment such as transformers, motors and converters, wholly aromatic polyamide sheetlike materials called aramid sheets or aramid boards have been used as insulating materials having better heat resistance.

Although cleaved natural mica, which is an inorganic material, has been used in the field when requiring a high level of electrical insulating properties exceeding the durability (especially corona resistance) of ordinary organic electrical insulating materials such as aramid sheets or aramid boards, production of large-sized natural mica of good quality is limited and expensive. Further, the product containing the cleaved natural mica is poor in flexibility. Consequently, there are various problems in molding processability and the like.

Methods for uniformly mixing finely divided mica, a readily available raw material, in place of such natural cleaved mica with a small amount of polymer fibrids, forming a sheet, and hot-pressing the resulting sheet, thereby integrating the mica with the reinforcing material, have been proposed [Japanese Laid-Open (Kokai) Patent Nos. 149703/1982 and 167374/1982]; however, the sheet bonded by the hot-pressing treatment barely develops the necessary strength and is deficient in flexibility. Therefore, the sheet has problems of insufficient responsiveness to complicated demands for processing as electrical and electronic parts.

It has also been proposed to obtain a high-temperature resistant sheetlike structure from an entangled mixture of particulate mica with substantially unfused wholly aromatic polyamide fibrids [Japanese Publication (Kokoku) Patent No. 20421/1968 and corresponding G.B. Patent No. 1129097]. In this method, particulate mica having a relatively small particle diameter is used. However, because of the relatively small particle diameter of the particulate mica to be blended, the particulate mica is not captured sufficiently by the wholly aromatic polyamide fibrids and, thus, easily falls off in hot-compression molding after forming the sheet. Because of this, a problem arises in that dispersion is caused in corona resistance.

Furthermore, there is also a well-known sheet composed of mica particles and wholly aromatic polyamide fibers wherein the mica particles are covered and connected with the wholly aromatic polyamide to provide the so-called mica-including pulp. The purpose of using this mica-including pulp is to provide improvement in oil impregnating properties [Japanese Publication (Kokoku) Patent Nos. 35763/1977 and 7961/1978 corresponding to U.S. Pat. No. 4,060,451]. Such mica-including pulp is excellent in bonding to the wholly aromatic polyamide fibers and improved capture of the fine mica particles can be expected. However, since producing the mica-including pulp requires complicated processes, the pulp is disadvantageous from a practical viewpoint.

SUMMARY OF THE INVENTION

Therefore, an object of this invention is to provide a sheetlike wholly aromatic polyamide shaped article suitable for use as electrically insulating materials having good mechanical (dynamic) characteristics and molding processability. Another object is to provide a sheetlike wholly aromatic polyamido shaped article exhibiting excellent electrical insulating properties, especially practically important durability for a long period under a constant load voltage, improvement in the so-called corona resistance and surface smoothness based on preventing the effects of falling off of fine mica particles. Still another object is to provide a sheetlike wholly aromatic polyamide shaped article for use as electrical insulating materials having flame retardancy and exhibiting almost no dimensional change due to temperature change and moisture absorption by stably introducing mica particles which are an inorganic material into the sheetlike wholly aromatic polyamide shaped article. A further object is to provide a method for efficiently producing the sheetlike wholly aromatic polyamide shaped article.

The objects described above have been accomplished by the sheetlike aromatic polyamide shaped article of this invention produced by wet shaping from an aqueous dispersion comprising 10 to 90% by weight, based on the total weight of all of the constituent components of the shaped article, of mica particles and 90 to 10% by weight, based on the total weight of all of the constituent components of the shaped article, of a wholly aromatic polyamide stock (i.e. the wholly aromatic polyamide fibrids or both the fibrids and wholly aromatic polyamide fibers) as principal compounding components by adding a nonionic polymer flocculant to the aqueous dispersion in wet shaping and has a corona durability of 150 minutes or above (under a load voltage of 20 kV/mm at an AC frequency of 1,000 Hz).

The sheetlike wholly aromatic polyamide shaped article is produced by a method for producing the sheetlike wholly aromatic polyamide shaped article, good in heat resistance, mechanical characteristics, dimensional stability and flame retardancy and excellent in electrical characteristics, surface smoothness and the like by using mica particles, preferably having the surface treated with a silane coupling agent, and adding a nonionic polymer flocculant to an aqueous dispersion comprising preferably 10 to 90% by weight, based on the total weight of all of the constituent components of the shaped article, of mica particles and 90 to 10% by weight, based on the total weight of all of the constituent components of the shaped article, of a wholly aromatic polyamide stock as principal compounding components in wet shaping the sheetlike shaped article from the aqueous dispersion.

DETAILED DESCRIPTION OF THE INVENTION

In this invention, the mica to be used as one of the raw materials need not always be one sheet of a platy material, and the so-called inexpensive "collected mica" prepared by dispersing fine particles in water and then integrating the particles into a sheetlike form may be used. The kind of mica may be any of muscovite, sericite, phlogopite, biotite and the like unless magnetic foreign materials (for example, iron powder) or foreign materials (for example, silica particles) having a large size, for example particles having a size of more than 0.1 mm, are also present. Among them, collected mica of the muscovite is especially practical.

According to this invention, the collected mica having a wide particle size distribution can be used, and this is also one of the advantages of this invention. That is, electrical characteristics (especially corona resistance) of the resulting shaped article will not be deteriorated even if fine particles (powder) passing through, for example a 250-mesh screen are present when wet shaping the sheetlike material from the mica particles and wholly aromatic polyamide stock.

Although there are methods for removing mica having a particle size below a certain limit, in order to prevent fine mica particles from falling off, this makes the process complicated and the methods are disadvantageous to costs in that separating steps are additionally required and treatment of the separated residual fine particulate mica causes problems and the like.

The mica particles are added in an amount of 10 to 90% by weight based on the total weight of all of the constituent components including the wholly aromatic polyamide stock. If the amount is below 10% by weight, the effects of the added mica are insufficient. If the amount exceeds 90% by weight, the mechanical strength and electrical characteristics of the resulting shaped article are unfavorably deteriorated. The amount added is preferably within the range of 30 to 70% by weight.

The wholly aromatic polyamide stock to be the other raw material is defined as a raw material capable of producing the wholly aromatic polyamide shaped article by dispersing the stock in water, then forming a sheet, drying the sheet, if necessary, hot-pressing the sheet or preshaping the sheet in a wire net frame mold, drying and hot-pressing the sheet. The constituent components are specifically fibrids (described in U.S. Pat. No. 3,018,091) and, optionally, fibers.

Thus, the wholly aromatic polyamide stock used in the method of this invention is composed of the so-called fibrids and fibers. The fibrids are preferably well beaten within a range so as not to disturb the freeness in wet shaping from an aqueous dispersion with respect to the aspects of improvement in mechanical and electrical characteristics of the shaped article obtained. The freeness is preferably within the range of 80 to 200 ml, expressed in terms of the Canadian freeness (CSF), depending on the basis weight of the shaped article, the mixing ratio, the particle size distribution of mica particles, and the like.

The compounding ratio (content) of the wholly aromatic polyamide stock based on the total weight of all of the constituent components of the sheetlike shaped article is 90 to 10% by weight. If the compounding ratio exceeds 90% by weight, electrical insulating properties of the resulting shaped article are insufficient. If the compounding ratio is below 10% by weight, the mechanical characteristics and electrical insulating properties of the shaped article are unfavorably deteriorated. The compounding ratio is preferably within the range of 70 to 30% by weight.

If wholly aromatic polyamide fibers are present in addition to the wholly aromatic polyamide fibrids in the stock, the mechanical characteristics of the obtained shaped article are improved. The amount of the fibers is preferably 30% by weight or below based on the total weight of all of the constituent components of the shaped article. If the amount of the fibers exceeds 30% by weight, electrical insulating properties are unfavorably deteriorated. The amount of the fibers is more preferably within the range of 5 to 20% by weight. Fibers produced by any of dry, wet or dry jet-wet spinning methods can be used as the fibers. Fibers having a size of 0.1 to 10 denier and a length of 3 to 20 mm are usually preferably used.

The wholly aromatic polyamide (or aramid) herein described is a generic name for polymers having an amide bond (—NH—CO—) which is directly bound to an aromatic ring. In this invention, a polymer having a recurring unit substantially composed of m-phenylene isophthalamide represented by the following formula (I), a polymer having a recurring unit substantially, for example at least 95 mol %, composed of p-phenylene terephthalamide represented by the following formula (II) and/or a copolymer having a recurring unit composed of the p-phenylene terephthalamide represented by the following formula (II) and 3,4'-diphenyl ether terephthalamide represented by the following formula (III) and the like are preferably used as the wholly aromatic polyamide:

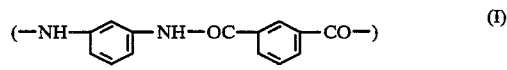
(I)

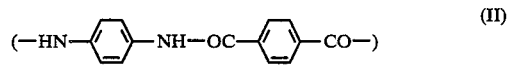
(II)

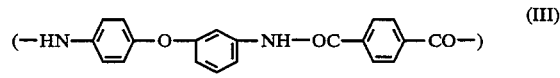
(III)

Fibrids and fibers of poly(m-phenylene isophthalamide), however, are preferably used in this invention.

A small amount of copolymerization components may be introduced, of course, within a range so as not to greatly impair the fundamental physical properties of the polymers. A small amount, for example 5% by weight, of a stock composed of other polymers (for example, polyethylene terephthalate) can be included in the wholly aromatic polyamide stock.

The sheetlike shaped article of the wholly aromatic polyamide containing mica particles is well known as mentioned above. As a result of research made by the present inventors, it has been found that the effects of the action of the mixed mica can be remarkably enhanced by including a small amount of a nonionic polymer flocculant in the aqueous dispersion of mica particles having a wide range of particle size distribution and a wholly aromatic polyamide stock in a prescribed proportion in water, and then forming a sheet with a paper machine or preshaping a sheet with a wire net frame mold, the sheet having a corona durability of 150 minutes or above. This cannot be achieved by conventional mica particle-containing wholly aromatic polyamide sheetlike shaped articles.

Examples of preferred nonionic polymer flocculants include polyacrylamide or polyethylene oxide polymer compounds such as "ACCOFLOC N-100" and "ACCOFLOC 102" manufactured by Mitsui-Cyanamid, Ltd., "KONANFLOC ZH-760" manufactured by Konan Chemical Industries Co., Ltd., "KURIFLOC PN-162" and "KURIFLOC PN-181" manufactured by Kurita Water Industries, Ltd., "ACRYPERSE" manufactured by Diafloc Co., Ltd. and "PEO-PF" manufactured by Sumitomo Seika Chemicals, Co., Ltd.

The amount of the nonionic polymer flocculant added to the aqueous dispersion for shaping depends on the solid component concentration in the aqueous dispersion; however, it is generally within the range of 0.01 to 100 ppm based on the water present in the aqueous dispersion or 0.05 to 1.0% by weight based on the solid content of the aqueous dispersion. If the amount is below the lower limit, effects of the flocculant added are insufficiently produced. If the amount exceeds the upper limit, the viscosity of water is unfavorably remarkably increased and this impairs the freeness or deteriorates electrical characteristics of the obtained shaped article. The amount is more preferably within the range of 0.1 to 20 ppm based on the water present. The nonionic polymer flocculant can be used in water at a pH within a wide range (pH 3 to 10) without any problems.

In a preferred embodiment of this invention, the mica particles are subjected to treatment with a silane coupling agent and used for shaping the sheet.

Conventional methods can be used to treat the mica particles with a silane coupling agent and include immersing the mica particles in an aqueous solution containing the silane coupling agent or a solution thereof in an organic solvent, applying the solution to the mica particles by spraying and the like. In this case, the surface treatment can be effectively carried out by using mica particles predispersed to a particle size suitable for the wet shaping.

Alkoxysilane coupling agents are preferred as the silane coupling agent. In this case, the number of alkoxy groups substituted on the silicon atom is not especially limited.

The amount of the silane coupling agent used for treating the surface of the mica particles (the amount of the silane coupling agent added into the treating liquid) depends on the amount of silanol groups present on the surface of the mica particles, the surface area of the mica particles to be treated, the kind of silane coupling agent to be used and the like; however, a range of 0.001 to 10% by weight based on the weight of the mica particles to be treated is preferably selected for practical use. Since the silane coupling agent is normally applied in an aqueous solution or diluted with an organic solvent, a method for regulating the concentration of the silane coupling agent in the solution is conveniently adopted. The concentration is preferably within the range of 0.01 to 5% by weight when the medium for the silane coupling treatment is an aqueous solution and within the range of 0.01 to 50% by weight when the medium for the silane coupling treatment is an organic solvent. The pH of the media can be adjusted, if necessary.

The sheetlike shaped article of this invention is formed by carrying out wet shaping of the aqueous dispersion comprising the wholly aromatic polyamide stock composed of the mica particles treated or untreated with the silane coupling agent, fibrids having the freeness regulated by a well-known method, fibers in an amount compounded within the above-mentioned range and the polymer flocculant added thereto. A papermaking method or pulp molding method can be used as a means for wet shaping.

For example, in order to produce the sheetlike shaped article of this invention, a prescribed amount of collected mica, optionally treated with a silane coupling agent, is taken in a suitable amount of water, slowly stirred and dispersed into a particulate form. On the other hand, the wholly aromatic polyamide stock is prepared by dispersing fibrids regulated so as to have an expected freeness by the well-known method and, if desired, fibers in an amount within the above-mentioned range, in a tank of water equipped with a stirrer. The water containing the mica dispersed therein is then added to the tank containing the wholly aromatic polyamide stock and the mixture is stirred. The nonionic polymer flocculant in a prescribed amount may be added to the tank or continuously added to a transported aqueous dispersion in the subsequent step in the case of papermaking. The flocculant may be added into the initial water containing the mica dispersed therein or the like. Since this polymer flocculant is usually commercially available in the form of solid or a concentrated aqueous solution, an aqueous solution previously prepared at a concentration of 1 to 5% is conveniently used for production.

In papermaking, any paper machines of ordinary cylinder, Tanmo and Fourdrinier machines can be utilized. The resulting wet web is dehydrated and dried to form sheets. A plurality of sheets, if necessary, can be laminated and hot-pressed to enhance the bonding of the respective materials constituting the sheets. A surface pressure of 10 to 100 kg/cm$^2$ and a linear pressure of 10 to 500 kg/cm can be cited as the preferred pressure in the hot-pressing treatment. A hot-pressing temperature of 230° to 330° C. is preferred.

Although a pulp molding method is cited as another example of wet shaping, hot-pressing can be performed within the ranges of temperature and pressure mentioned above after the wet shaping.

If a solid (three-dimensional) sheetlike shaped article is desired, methods can be adopted for presphaping, by the so-called pulp molding method, which involve filling a container with an adequate amount of a dispersion of mica, wholly aromatic polyamide stock and polymer flocculant; placing a wire net frame mold equipped with a suction device therein; suction molding the contents; drying; and compression molding the preformed sheet with a metallic mold of a prescribed shape. The optimum temperature and pressure at this time are respectively a temperature of about 230° to 330° C. and a surface pressure of 10 to 100 kg/cm$^2$, depending on the slurry constituent components.

The sheetlike wholly aromatic polyamide shaped article is efficiently and economically produced by the method described above.

A feature of this invention is the ability to use mica having a wide range of particle distribution without deteriorating electrical characteristics, especially corona durability of the shaped article. This feature is retained even if fine powder passing through, for example a 250-mesh screen is present while mixing and shaping the mica with the wholly aromatic polyamide stock after dispersing in water. When the mica particles having a wide range of particle size distribution are used, methods for previously eliminating mica having a particle size below a certain limit are disadvantageous to cost, even if the methods are easy, because the process is complicated by having to include the separation steps and by having to treat the residual particulate mica after separation and the like in industrial production. Thus, the invention is industrially advantageous.

Flocculating effects on fine mica powder are recognized in the nonionic polymer flocculant and further anionic polymer and cationic polymer flocculants; however, the second and the last polymer flocculants deteriorate electrical characteristics and are not suitable.

Thus, the sheetlike shaped article of this invention has a corona durability of 150 minutes or above, preferably 300 to 700 minutes, as measured by the method described hereinafter and is remarkably improved in the corona resistance as compared with that which does not use the nonionic polymer flocculant. The basis weight of the sheet is selected according to its use and is preferably 50–1000 g/m$^2$, more preferably 100–500 g/m$^2$. The thickness of the sheet is also selected according to its use and is preferably 0.05–1.0 mm, particularly 0.1–0.5 mm.

The fluctuation in the corona durability is slight, and the coefficient of variation is within the range of 30%. The surface smoothness is excellent and shows a value of 6.5% or above expressed in terms of the Bekk smoothness.

The sheetlike wholly aromatic polyamide shaped article good in heat resistance, mechanical characteristics, dimensional stability, flame retardancy and the like can be produced according to this invention. Furthermore, as for electrical characteristics, especially corona resistance of the shaped article, there are effects on both the improvement in the average value of corona durability and the reduction in dispersion, and electrical insulating properties (dielectric breakdown voltage) are improved. Since electrical insulating materials are practically designed by considering not the average value of performances but the lower limit value of dispersion, the shaped article according to this invention is especially useful for enhancing the reliability of materials.

Furthermore, the shaped article according to this invention has advantages in that surface smoothness, dimensional stability and molding processability are excellent. Consequently, the shaped article according to this invention is especially useful as electrical insulating materials.

Since relatively inexpensive "collected mica" can be used without sieving, this invention has also advantages in that the objective shaped article is extremely economically obtained.

The effects mentioned above are remarkable when mica particles are pretreated with the silane coupling agent. Thus, although effects of treatment of the mica particles with the silane coupling agent and addition of the polymer flocculant to the aqueous dispersion in combination are not always clear, it is assumed that capturing effects of the mica particles are promoted with the polymer flocculant and interaction of the wholly aromatic polyamide stock with the mica particles is enhanced by treatment with the silane coupling agent, resulting in an improvement in electrical and mechanical characteristics of the sheetlike shaped article.

This invention is now illustrated by way of Examples and Comparative examples which do not limit the contents of this invention at all. Respective characteristic values shown in Examples are obtained by the methods of measurement described below. The simple expression "parts" indicates "parts by weight".

(a) Inherent viscosity: The inherent viscosity of the polymer was measured as a solution having a concentration of 0.5 g/100 ml in 95% sulfuric acid (unit: dl/g).

(b) Dielectric breakdown voltage: According to JIS-C2111. Measured under an AC voltage (unit: kV/mm).

(c) Corona durability: The time to dielectrically breakdown 5 of 10 test specimens at 20° C., 65% RH and a frequency of 1,000 Hz under an AC load voltage of 20 kV/mm (unit: minutes).

(d) Coefficient of variation of corona: Expressed as a percentage obtained by dividing the difference between the second longest breakdown time of the sample (the first breakdown time is not used, because other factors easily influence the time) and the fifth longest breakdown time of the sample (corona durability) by the corona durability obtained in the corona durability test (unit: %).

(e) Surface smoothness: According to the test method of JIS-P8119 (1976) with a Bekk smoothness tester (unit: seconds).

EXAMPLES 1 TO 3 AND COMPARATIVE EXAMPLES 1 TO 3

(A) Preparation of fibrids and fibers

Poly(m-phenylene isophthalamide) polymer (inherent viscosity: 1.6) prepared by the interfacial polycondensation method described in U.S. Pat. No. 3,640,970 was dissolved in N-methyl-2-pyrrolidone to prepare a dope. The dope was spun through a spinneret having many orifices into a bath composed of an aqueous solution to form yarns. The yarns were washed by water, drawn, heat-treated and then wound up. The yarn was cut into shortcut fibers. The product obtained was m-aramid fibers having a size of 2.0 denier, a length of 6 mm, a strength of 5.8 g/d and an elongation of 40%. The dope, also, was coagulated and precipitated in a shearing bath by rotation of a metal rotor having many bumps to form fibrids. They were washed by water and then beaten to provide fibrids (pulplike particles) of the poly(m-phenylene isophthalamide) (hereinafter abbreviated to "m-aramid fibrids") having a Canadian standard freeness (CSF) of 170 ml.

(B) Particle size distribution of mica particles

Hard burned collected mica (CZ2T, manufactured by Japan Mica Industrial Co., Ltd.), wholly passing through a 16-mesh screen by a wet sieving method and having the distribution peak at about 60 mesh and a 250-mesh undersize content of 7% was used for all the runs.

(G) Preparation of sheets

The m-aramid fibrids (P) and fibers (F) prepared in (A) and the mica particles (M) described in (B) in a total amount of 75 parts were dispersed in water in an amount of about 600 times so as to respectively provide compounding weight ratios of P/F/M=60/10/30 (Example 1), 40/10/50 (Example 2) and 20/10/70 (Example 3).

To each of the aqueous dispersions, was added 0.075 part (0.1% by weight based on the total amount of the raw materials) polyacrylamide (trade name ACRYPERSE, manufactured by Diafloc Co., Ltd.) as a nonionic polymer flocculant. The resulting dispersions were then stirred at ambient temperature for about 1 minute. The nonionic polymer flocculant ACRYPERSE was dissolved in water to prepare a 1% aqueous solution and added as an agent component (nonaqueous component) so as to afford 0.1% by weight.

The dispersion slurries were formed into sheets by a cylinder paper machine at a width of 60 cm, dried in a Yankee dryer at 130° C. and wound into rolls (at a speed of 2 m/min). Sheets were then taken out of the two rolls, passed through a preheating layer at 290° C., passed through two metallic rolls at the set temperature of 300° C. under a linear pressure of 200 kg/cm and lamination calendered (at a speed of 2 m/min) to afford sheets. Table 1 shows the results obtained and the physical properties.

For the purpose of comparison, sheets were formed in the same manner as in Examples 1 to 3, except that the nonionic polymer flocculant was not added. The resulting sheets were calendered (Comparative Examples 1 to 3). Table 1 also shows the results obtained and the physical properties.

respectively dispersed in water in an amount of about 600 times so as to provide the compounding ratios in Table 2. To the respective aqueous dispersions, was added 0.15 part (0.2% by weight based on the total amount of the raw materials) of the nonionic polymer flocculant ACRYPERSE. Sheets were formed, dried and wound into rolls in the same manner as in Examples 1 to 3 (C).

Lamination calendering was then carried out in the same manner to produce sheets. Table 2 shows the respective results and the physical properties of the sheets.

TABLE 2

|  | Composition of raw material [P/M] | Basis weight (g/m$^2$) | Thickness (mm) | Bulk density (g/cm$^3$) | BDV (kV/mm) | Corona durability | | Bekk smoothness (%) |
|---|---|---|---|---|---|---|---|---|
|  |  |  |  |  |  | Time (min) | Coefficient of variation (%) |  |
| Example 4 | 10/90 | 233 | 0.165 | 1.41 | 35 | 183 | 21.7 | 7.5 |
| Example 5 | 30/70 | 231 | 0.172 | 1.34 | 41 | 473 | 12.5 | 8.1 |
| Example 6 | 50/50 | 230 | 0.178 | 1.29 | 46 | 645 | 9.6 | 8.6 |
| Example 7 | 70/30 | 234 | 0.180 | 1.30 | 45 | 328 | 14.4 | 8.8 |
| Example 8 | 90/10 | 232 | 0.174 | 1.33 | 34 | 151 | 23.5 | 9.3 |
| Comparative Example 4 | 100/0 | 229 | 0.166 | 1.38 | 38 | 76 | 81.9 | 6.2 |

As can be seen from the runs, the amount of mica particles affecting electrical insulating properties, especially corona durability, was 10 to 90% by weight, preferably 30 to 70% by weight.

EXAMPLES 9 TO 11

Formation of sheets, drying and calendering were carried out in all the same manner, except that 0.1% by weight of polyethylene oxide (trade name PEO-PF, manufactured by Sumitomo Seika Chemicals Co., Ltd.) was used in place of the polyacrylamide (ACRYPERSE) as the nonionic polymer flocculant in Examples 1 to 3. Table 3 shows the results obtained.

TABLE 1

|  | Composition of raw material [P/F/M] | Basis weight (g/m$^2$) | Thickness (mm) | Bulk density (g/cm$^3$) | BDV (kV/mm) | Corona durability | | Bekk smoothness (%) |
|---|---|---|---|---|---|---|---|---|
|  |  |  |  |  |  | Time (min) | Coefficient of variation (%) |  |
| Example 1 | 60/10/30 | 232 | 0.197 | 1.18 | 41 | 467 | 19.8 | 7.9 |
| Example 2 | 40/10/50 | 236 | 0.198 | 1.19 | 46 | 520 | 16.5 | 8.1 |
| Example 3 | 20/10/70 | 231 | 0.190 | 1.21 | 43 | 485 | 17.3 | 8.6 |
| Comparative Example 1 | 60/10/30 | 228 | 0.207 | 1.10 | 38 | 100 | 89.4 | 5.8 |
| Comparative Example 2 | 40/10/50 | 226 | 0.197 | 1.15 | 40 | 98 | 80.5 | 5.9 |
| Comparative Example 3 | 20/10/70 | 221 | 0.188 | 1.18 | 35 | 112 | 77.7 | 5.7 |

Effects of addition of the nonionic polymer flocculant were confirmed by the runs.

EXAMPLES 4 TO 8 AND COMPARATIVE EXAMPLE 4

(D) Preparation of sheets

The same fibrids and mica particles as those used in Examples 1 to 3 in a total amount of 75 parts were

TABLE 3

|  | Composition of raw material [P/F/M] | Basis weight (g/m$^2$) | Thickness (mm) | Bulk density (g/cm$^3$) | BDV (kV/mm) | Corona durability | | Bekk smoothness (%) |
|---|---|---|---|---|---|---|---|---|
|  |  |  |  |  |  | Time (min) | Coefficient of variation (%) |  |
| Example 9 | 60/10/30 | 229 | 0.188 | 1.22 | 46 | 515 | 24.6 | 8.2 |
| Example 10 | 40/10/50 | 231 | 0.197 | 1.17 | 51 | 547 | 18.8 | 7.9 |
| Example 11 | 20/10/70 | 226 | 0.192 | 1.18 | 43 | 430 | 23.4 | 7.0 |

As can be seen from the runs, the polyethylene oxide was also extremely effective in improving electrical insulating properties of the mica blended paper.

It is understood from comparison of Examples 1 to 11 with Comparative Examples 1 to 4 that the surface smoothness is improved by addition of the flocculant in the mica blended paper and remarkable effects of action are not recognized in paper of 100% aramid without mica (see Comparative Example 4).

EXAMPLES 12 TO 14

(A) Preparation of fibrids and fibers

The polymer poly(m-phenylene isophthalamide) was prepared based on the method described in Japanese Patent Publication (Kokoku) Patent No. 10863/1972 (corresponding to U.S. Pat. No. 3,640,970) by interfacial polycondensation. The polymer was then dissolved in N-methyl-2-pyrrolidone and the inherent viscosity (IV) measured was 1.35. Inorganic salts were not present.

This polymer was formed into fibers based on the wet spinning method described in Japanese Publication (Kokoku) Patent No. 17551/1973 and U.S. Pat. No. 4,073,837, drawn in boiling water and further drawn on a hot plate to afford fibers having a tensile strength of 4.5 g/de and an elongation of 18%. The resulting fibers were cut to a length of 6 mm.

Fibrids were prepared from the above-mentioned polymer by using a precipitation device (diameter: 150 mm) described in Japanese Laid-Open (Kokai) Patent Mo. 15621/1977 and beaten with a disk refiner. The freeness of the fibrids was 110 ml expressed in terms of the Canadian freeness.

(B) Particle size distribution of mica particles

Hard burned collected mica (CZ2T, manufactured by Japan Mica Industrial Co., Ltd.), wholly passing through a 16-mesh screen by a wet sieving method and having the distribution peak at about 60 mesh and a 250-mesh undersize of 7% was used for all the runs.

(C) Treatment of mica particles with silane coupling agent

The collected mica in an amount of 0.38 part was mixed with 100 parts of water, and the mixture was then dispersed in a pulper. To the dispersion, was added 0.01 part (2.6% based on the mica) of N-(triethoxysilylpropyl)urea. The dispersion was slowly stirred for 1 hour, then taken out and dried. The mica particles obtained were used in the next step.

(D) Preparation of sheetlike shaped article

The fibrids (P) and fibers (F) of the poly(m-phenylene isophthalamide) prepared in (A) and the mica particles (M), treated with the silane coupling agent and prepared in (C) in a total amount of 75 parts were mixed and dispersed in water in an amount of about 600 times so as to respectively provide compounding ratios of P/F/M=60/10/30, 40/10/50 and 20/10/70. The polyacrylamide (trade name ACRYPERSE, manufactured by Diafloc Co., Ltd.) in an amount of 0.075 part (at a concentration of 1.7 ppm in water and in an amount of 0.1% by weight based on the solid content) as a nonionic polymer flocculant was added and stirred. A method for adding a required amount of a previously prepared 1% aqueous solution of the ACRYPERSE was used.

The dispersion slurries were then formed into sheets with a Fourdrinier paper machine at a speed of 2 m/min, dried in a Yankee dryer at 130° C. and then wound into rolls. Sheets were taken out of the two rolls and lamination calendered under conditions of a temperature of 300° C. under a linear pressure of 200 kg/cm. Table 4 shows the physical properties of the sheetlike shaped article obtained.

EXAMPLE 15 AND COMPARATIVE EXAMPLE 5

Sheets were formed in the same manner and under the same conditions as in Example 2, except that the silane coupling agent was changed for trimethoxysilylpropyldiethylenetriamine. Sheets were made from a composition of raw materials in which P/F/M was 40/10/50, The two resultant sheets were lamination calendered under conditions of 250° C. and 150 kg/cm.

For the purpose of comparison, sheets were formed in the same manner under the same conditions as described above without performing the treatment with the silane coupling agent and using the polymer flocculant, and the obtained sheets were similarly calendered (Comparative Example 5).

Table 5 shows both the results together.

TABLE 4

| | Composition of raw material [P/F/M] | Basis weight (g/m$^2$) | Thickness (mm) | Bulk density (g/cm$^3$) | BDV (kV/mm) | Tensile strength (kg/mm$^2$) | Corona durability | |
|---|---|---|---|---|---|---|---|---|
| | | | | | | | Time (min) | Coefficient of variation (%) |
| Example 12 | 60/10/30 | 231 | 0.199 | 1.16 | 40 | 4.7 | 480 | 21.2 |
| Example 13 | 40/10/50 | 236 | 0.203 | 1.16 | 47 | 5.8 | 556 | 13.4 |
| Example 14 | 20/10/70 | 230 | 0.200 | 1.15 | 44 | 3.5 | 510 | 15.4 |

TABLE 5

| | Basis weight (g/m$^2$) | Thickness (mm) | Bulk density (g/cm$^3$) | BDV (kV/mm) | Tensile strength (kg/mm$^2$) | Corona durability | |
|---|---|---|---|---|---|---|---|
| | | | | | | Time (min) | Coefficient of variation (%) |
| Example 15 | 222 | 0.141 | 1.57 | 59 | 4.2 | 491 | 19.3 |
| Comparative Example 5 | 224 | 0.159 | 1.41 | 53 | 5.3 | 88 | 89.6 |

EXAMPLE 16

Mica particles subjected to treatment with the silane coupling agent solution in the same manner as in Example 15 without carrying out drying at 120° C. for 2 hours were used for papermaking to similarly produce a shaped article. Table 6 collectively shows the composition of the raw materials, the amount of the silane coupling agent and the flocculant used, basis weight, thickness and the like of the sheet, and Table 7 summarizes physical properties of each resulting sheet.

TABLE 6

| | Composition of raw material [P/F/M] | Coupling agent (%) | Flocculant (%) | Basis weight (g/m²) | Thickness (mm) |
|---|---|---|---|---|---|
| Example 16 | 40/10/50 | 2.6 | 0.1 | 235 | 0.151 |

(Notes)
The coupling agent (%) is % by weight based on the mica particles.
The flocculant (%) is % by weight based on the solid content.

TABLE 7

| | Bulk density (g/cm³) | BDV (kV/mm) | Tensile strength (kg/mm²) | Corona durability Time (min) | Corona durability Coefficient (%) |
|---|---|---|---|---|---|
| Example 16 | 1.56 | 43 | 5.8 | 485 | 18.7 |

We claim:

1. A sheet-like wholly aromatic polyamide shaped article for use as electrical insulating materials produced by wet-shaping from an aqueous dispersion comprising 10 to 90% by weight, based on the total weight of all of the constituent components of the shaped article, of mica particles and 90 to 10% by weight, based on the total weight of all of the constituent components of the shaped article, of a wholly aromatic polyamide stock, which is composed of wholly aromatic polyamide fibrids and wholly aromatic polyamide fibers, and wherein said shaped article contains a nonionic polymer flocculant and has a corona durability of 150 minutes or above under a load voltage of 20 kv/mm at AC frequency of 1,000 hz.

2. The sheet-like wholly aromatic polyamide shaped article according to claim 1, wherein the content of the wholly aromatic polyamide fibers is 30% by weight or below based on the total weight of all of the constituent components of the sheet-like shaped article.

3. The sheetlike wholly aromatic polyamide shaped article according to claim 1, wherein the wholly aromatic polyamide stock is composed substantially of poly(m-phenylene isophthalamide), poly(p-phenylene terephthalamide) and/or copoly(p-phenylene/3,4'-diphenyl ether-terephthalamide).

4. The sheetlike wholly aromatic polyamide shaped article according to claim 1, wherein the nonionic polymer flocculant is substantially a polyaorylamide compound and/or a polyethylene oxide compound.

5. The sheetlike wholly aromatic polyamide shaped article according to claim 1, wherein the mica particles are pretreated with a silane coupling agent.

6. The sheetlike wholly aromatic polyamide shaped article according to claim 1, wherein the corona durability has a coefficient of variation within 30%.

7. The sheetlike wholly aromatic polyamide shaped article according to claim 1, wherein said shaped article is hot-pressed after wet shaping.

8. A method for producing a sheetlike wholly aromatic polyamide shaped article for use as electrical insulating materials, which comprises adding a nonionic polymer flocculant in an amount of 0.01 to 100 ppm based on the amount of water in said aqueous dispersion to said aqueous dispersion which comprises 10 to 90% by weight, based on the total weight of all of the constituent components of the shaped article, of mica particles which are pretreated with a silane coupling agent and 90 to 10% by weight, based on the total weight of all of the constituent components of the shaped article, of a wholly aromatic polyamide stock as principal compounding components which is composed of wholly aromatic polyamide fibrids and wholly aromatic polyamide fibers, and then shaping the sheetlike shaped article according to a papermaking or pulp molding method from said aqueous dispersion.

9. The method according to claim 8, wherein the content of wholly aromatic polyamide fibers is 30% by weight or below based on the total weight of all of the constituent components of the sheetlike wholly aromatic polyamide shaped article.

10. A method for producing a sheetlike shaped article comprising a plurality of sheets, said method comprising drying two or more of the sheetlike articles produced according to claim 8, laminating said two or more articles, and hot-pressing the laminated articles.

11. The method according to claim 10, wherein the hot-pressing is carried out at a temperature of 230° to 330° C. under a linear pressure of 10 to 500 kg/cm.

* * * * *